United States Patent [19]

VandenBerge et al.

[11] Patent Number: 4,760,503
[45] Date of Patent: Jul. 26, 1988

[54] VISOR FOR A VEHICLE

[75] Inventors: Thomas C. VandenBerge, Jenison; Scott A. Spykerman, Holland, both of Mich.

[73] Assignee: Prince Corporation, Holland, Mich.

[21] Appl. No.: 912,798

[22] Filed: Sep. 26, 1986

[51] Int. Cl.⁴ ............................................. F21V 33/00
[52] U.S. Cl. .................................... 362/137; 362/144; 362/135; 362/270; 362/275; 362/299; 362/80
[58] Field of Search ................ 362/137, 144, 74, 135, 362/142, 61, 140, 80, 141, 275, 299, 270

[56] References Cited

U.S. PATENT DOCUMENTS

| | | |
|---|---|---|
| 2,641,684 | 6/1953 | Dillon . |
| 3,211,903 | 10/1965 | McElreath . |
| 3,375,364 | 3/1968 | Marcus ............................ 362/270 X |
| 3,926,470 | 12/1975 | Marcus . |
| 4,000,404 | 12/1976 | Marcus . |
| 4,075,468 | 2/1978 | Marcus . |
| 4,174,864 | 11/1979 | Viertel et al. .................... 362/144 X |
| 4,203,149 | 5/1980 | Viertel et al. ........................ 362/144 |
| 4,213,169 | 7/1980 | Kempkers . |
| 4,227,241 | 10/1980 | Marcus . |
| 4,227,242 | 10/1980 | Marcus .................................. 362/61 |
| 4,353,592 | 10/1982 | Cziptschirsch . |
| 4,479,172 | 10/1984 | Connor .......................... 362/299 X |
| 4,491,899 | 1/1985 | Fleming . |
| 4,500,131 | 2/1985 | Fleming . |
| 4,511,954 | 4/1985 | Marcus et al. ...................... 362/275 |
| 4,715,644 | 12/1987 | Labanoff et al. .................. 296/97 H |

Primary Examiner—Larry Jones
Attorney, Agent, or Firm—Price, Heneveld, Cooper, DeWitt & Litton

[57] ABSTRACT

A visor assembly including a pivoted cover for a vanity mirror which includes camming surfaces on the pivot socket for urging the cover between open and closed positions. In one embodiment, the visor is selectively illuminated by the operation of a cover controlled switch. In another embodiment, the mirror and cover assembly is snap fitted within the visor.

19 Claims, 2 Drawing Sheets

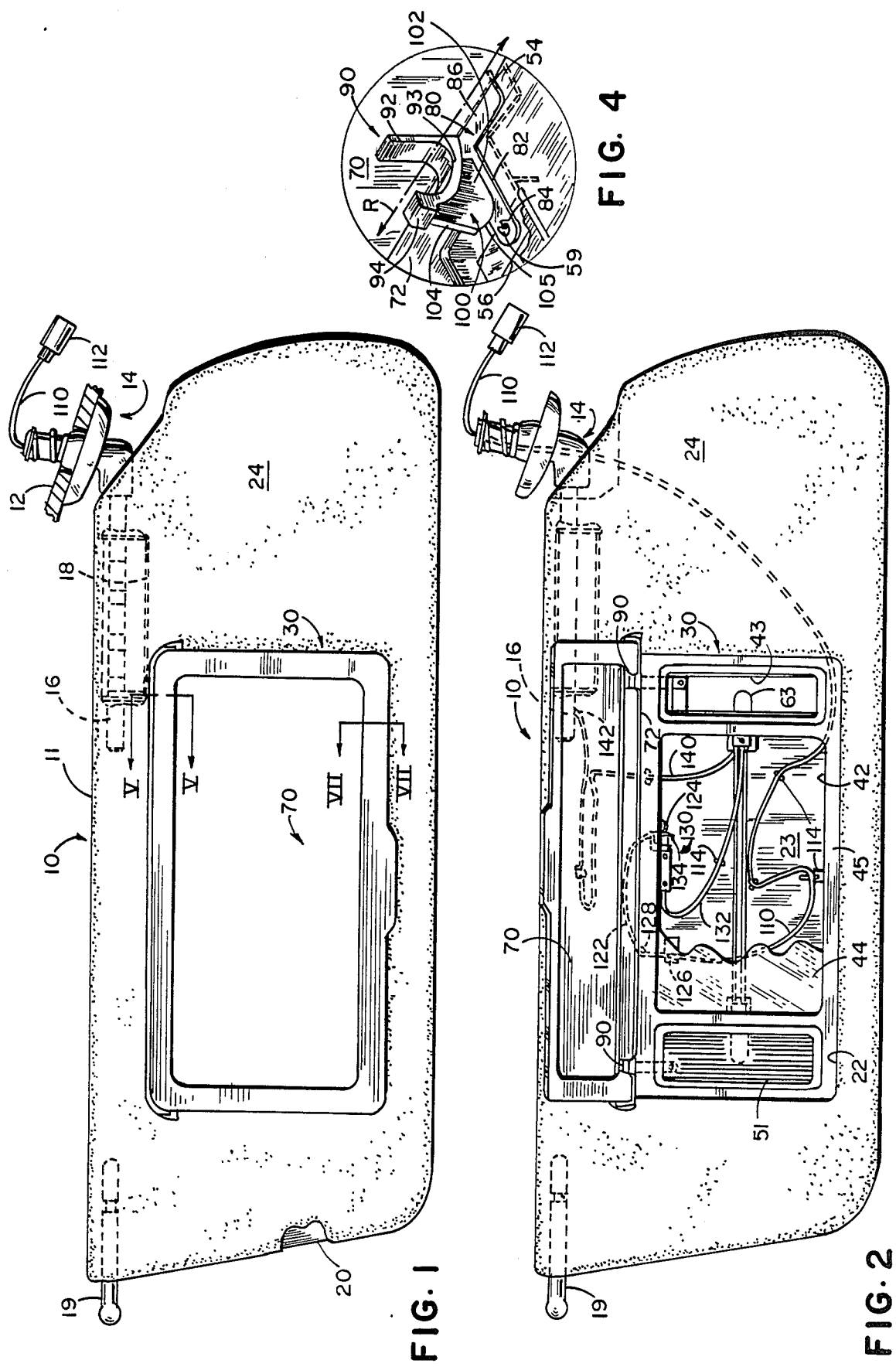

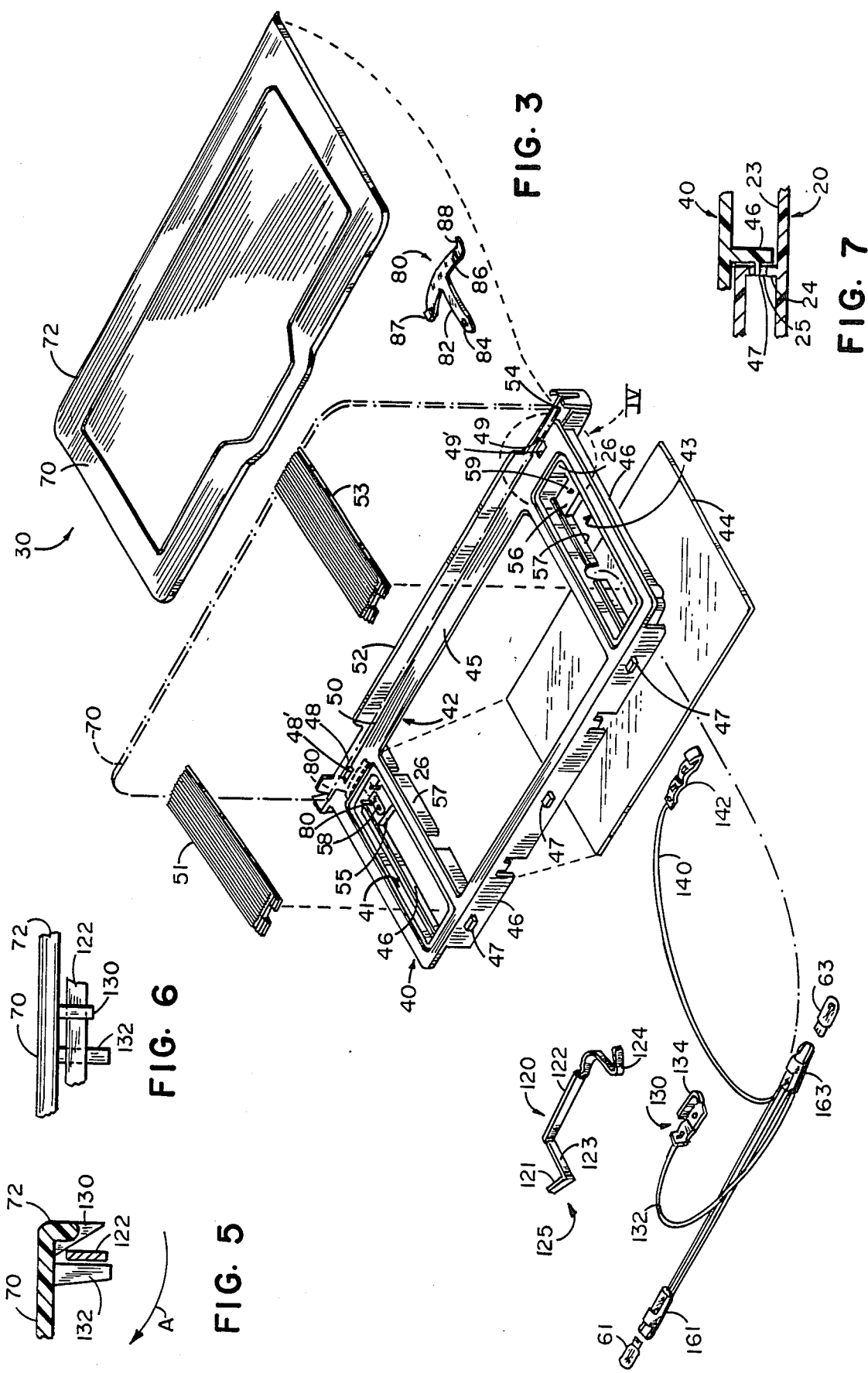

VISOR FOR A VEHICLE

BACKGROUND OF THE INVENTION

The present invention pertains to a visor and particularly to a visor having a vanity mirror.

Illuminated vanity mirror visors have become a popular accessory on many vehicles and standard equipment on several vehicle models. Such visors provide the normal sun blocking functions and in addition provide a vanity mirror which can be illuminated for use under low ambient light conditions. The mirror in such visor is selectively covered by a protective cover to conceal the mirror when not in use. This visor construction is disclosed in U.S. Pat. No. 4,227,241, issued Oct. 7, 1980, and entitled VISOR ASSEMBLY. In such visor construction, the cover is spring biased to selective open and closed positions so that the cover will remain closed under the force of the spring or remain in a snapped-open position. A coil spring coupled to the visor mirror frame and to an arm on the cover pivot is employed to provide this desirable cover control.

Other visor controls have also been proposed such as a spring coupled between the visor frame and directly to the cover as, for example, disclosed in U.S. Pat. No. 4,491,899, issued Jan. 1, 1985, and entitled VISOR COVER ASSEMBLY. Also, a visor cover pivot rod and mirror frame socket have included camming means for controlling the visor cover. Such structure is disclosed, for example, in U.S. Pat. No. 4,213,169, issued July 15, 1980, and entitled COVERED VISOR MIRROR. Other covered vanity mirror visors have employed L-shaped leaf springs extending between a separate housing for a mirror frame and a cover mounted to the housing to cooperate with tabs on the cover for urging and holding the cover between closed and open positions.

Some of the covered vanity mirror visors also include lights for the mirror to facilitate its use in low ambient light conditions. It is desirable for safety and convenience to actuate the lights by the actuation of the cover, and a variety of switch arrangements have been proposed such as those set forth in U.S. Pat. Nos. 4,000,404, issued Dec. 28, 1976, and entitled VISOR ILLUMINATED MIRROR; and 4,075,468, issued Feb. 21, 1978, and entitled VISOR AND MIRROR ASSEMBLY. In addition, push-button switches mounted to the mirror frame and actuated upon opening and closing of the cover have been provided as have knife switches with one element of the knife switch mounted to the cover and the remaining element of the knife switch mounted to the mirror housing.

SUMMARY OF THE PRESENT INVENTION

According to one aspect of the present invention a covered vanity mirror visor is provided with improved control means for holding the cover in either a fully opened or fully closed position. Visors embodying this invention include a leaf spring mounted to the mirror frame of the visor for engaging camming means integral with the cover and pivot means of the cover for urging the cover toward open or closed positions. In a preferred embodiment of the invention, the leaf spring is generally T-shaped including means for captively holding the spring in a predetermined position for engagement by the camming means associated with the cover. In the preferred embodiment also, the cover cam means are integrally formed with a pivot socket of the visor cover.

According to another aspect of the present invention, the vanity mirror visor includes means for providing illumination for the mirror associated therewith which includes an electrical switch having a stationary contact and a movable contact which is engaged by finger means on the cover such that as the cover is moved between an open and closed position, the movable switch contact is positively closed or opened respectively by the finger means to assure the switch is actuated when the cover is open for providing illumination for the illuminated vanity mirror and opened when the cover is closed to assure the illuminating means is extinguished. In a preferred embodiment of the invention, the movable switch contact comprises a resilient arm, and the cover cam means comprise a pair of spaced fingers spanning opposite sides of the arm to urge the arm in opposite directions for opening and closing the switch.

According to yet a further aspect of the invention, the vanity mirror assembly of the present invention comprises a package which is insertable and snap fitted in a recess formed in a visor body and which can be readily assembled from a minimum of parts thereby reducing the overall cost of the system. These and other features, objects and advantages of the present invention will become apparent upon reading the following description thereof together with reference to the accompanying drawings in which:

BRIEF DESCRIPTION OF THE DRAWINGS

FIG. 1 is a front elevational view partly broken away and partly in phantom form of a visor embodying the present invention;

FIG. 2 is a front elevational view of the visor shown in FIG. 1 shown with the mirror cover moved to an open position and with the mirror partly broken away and one lens removed to show the positioning of the electrical circuit elements associated with the illuminated vanity mirror visor;

FIG. 3 is a partly exploded view of the illuminated vanity mirror assembly which is incorporated in the visor shown in the FIGS. 1 and 2;

FIG. 4 is an enlarged fragmentary perspective view of the circled area shown in FIG. 3 and shown with a portion of the mirror frame showing the relationship of the cover operational elements;

FIG. 5 is an enlarged fragmentary cross-sectional view taken along section lines V—V of FIG. 1;

FIG. 6 is a right side elevational view of the structure shown in FIG. 5; and

FIG. 7 is a fragmentary enlarged cross-sectional view taken along section lines VII—VII of FIG. 1.

DETAILED DESCRIPTION OF THE PREFERRED EMBODIMENT

Referring initially to FIG. 1, there is shown a visor 10 mounted to the roof 12 of a vehicle such as an automobile by a conventional elbow bracket pivot assembly 14 which includes a horizontal axle 16 extending within the body of the visor near the upper edge 11 thereof. Visor 10 pivots on axle 16 by means of a torque device 18 which can be of the type described in U.S. Pat. No. 4,500,131, issued Feb. 19, 1985, and entitled VISOR CONTROL. This permits the visor 10 to be moved from a raised stored position against the vehicle headliner when not in use or a lowered use position as illustrated in FIGS. 1 and 2. The left edge of the visor remote from pivot connection 14 includes a stub axle 19 which fits within a suitable clip mounted to the vehicle for supporting the opposite end of the visor.

Visor 10 includes a body made of a polymeric core 20 typically molded in two halves hinged together and which includes a generally rectangular recess 22 centrally located in one side thereof for receiving an illuminated vanity mirror assembly 30. The visor core 20 is covered by a suitable upholstery material 24 to conform the visor's appearance to that of the interior of the vehicle in which it is installed. Recess 22 of the visor core 20 includes a floor 23 (FIG. 2) onto which the circuit elements of assembly 30 can be installed as described below. The construction of the illuminated vanity mirror assembly 30 can best be understood by reference to FIG. 3 now described.

Assembly 30 includes a generally rectangular mirror frame assembly 40 defined by a rectangular flange 45 having a central generally rectangular opening 42 for receiving and holding a rectangular mirror 44 which is inserted from the rear and held in place along the edges of opening 42 by heat deformed tabs. Adjacent and spaced on each side of aperture 42 are lens receiving apertures 41 and 43 for receiving left and right side lenses 51 and 53 respectively, which snap fit within apertures 41 and 43 and which are keyed thereto by means of keying tabs and slots at their edges. Lenses 51 and 53 are designed to direct illumination from lamps 61 and 63 positioned behind the lenses within apertures 41 and 43 outwardly and centrally toward the face of the user of the mirror 44.

Mirror frame 40 includes downwardly depending peripheral walls 46 with the front wall as seen in FIG. 3 including spaced locking tabs 47 which cooperate with slots 25 (FIG. 7) formed in the edge wall 24 of recess 22 for snap fitting mirror frame 40 into the visor body recess attaching the frame to the molded core 20. The polymeric molded mirror frame 40 also integrally includes a pair of pivot axles 48 and 49 spaced along the top edge 50 of the frame generally in alignment with lens apertures 41 and 43. Axles 48 and 49 are circular and are integrally formed by an injection molding of suitable material such as polyvinyl chloride or A.B.S. and which includes the forming of adjacent rectangular clearance apertures 48' and 49' allowing socket means associated with a mirror cover 70 and shown in detail in FIG. 4 to partially circumscribe each of the axles 48 and 49 and extend through the adjacent apertures 48' and 49'.

The upper edge 50 of mirror frame 40 includes an upwardly opening U-shaped structure including the wall 46, integral floor 54 and an upwardly extending vertical end wall 52 to provide a pocket for receiving the upper edge of cover 70 and stiffening of the frame member along the top edge adjacent pivot axles 48 and 49. The floor means further includes cross members 55 and 56 extending below and across each of the apertures 41 and 43 respectively. Each cross member is supported at its outer end by a downwardly extending peripheral side wall 46 and at its inner, opposite end by a downwardly projecting inner wall 57 adjacent one of apertures 41 and 43. The cross members 55 and 56 each include a upwardly projecting indexing tab 58 and 59 for positioning and holding one end of a T-shaped leaf spring 80 mounted to the frame 40.

As seen in FIGS. 3 and 4, the assembly includes a pair of the T-shaped springs 80 with each spring including a central leg 82 having an aperture 84 near its end which extends over the indexing projection 58 or 59. Leg 82 integrally extends from the top member 86 of each of the springs 80 which is curved in a convex fashion as viewed in FIG. 3 with upwardly turned ends 87 and 88 which rest against the floor 54 of the U-shaped upper portion of frame 40. Leg 82 extends through an access opening 26 in the upper peripheral wall 46 as best seen in the left side of FIG. 3, such that the indexing tabs 58 or 59 captively holds each of the springs 80 in position with respect to frame 40. In their installed position, the intersection of legs 82 and 86 is approximately aligned underneath the pivot axles 48 and 49 to engage the integral cam and socket means on cover 70 as described below in connection with FIG. 4.

In FIG. 4, the upper surface area of frame 40 surrounding aperture 49' is not illustrated nor is the pivot axle 49 for the sake of clarity in showing the camming means and pivot socket associated with cover 70 in relation to the spring 80. Cover 70 includes along its inner top edge a pair of spaced open semicylindrical resilient pivot sockets 90 which are aligned to fit over pivot axles 48 and 49. The right side socket 90 is illustrated in FIG. 4 and includes a pair of arms 92 and 94 with arm 92 integrally formed and attached to the inner surface of the polymeric cover 70 near the top edge 72 thereof. Arms 94 and 92 are joined by curved section 93 defining a semicircular socket with arm 94 sufficiently resilient so that the open sockets so formed can be snap fitted over axles 48 and 49 thereby attaching the cover to the mirror frame 40.

Integrally formed and extending on the outer surface of each of the generally C-shaped sockets so formed is a vertically extending flange 100 with outer edge surfaces defining camming means having a first camming surface 102 which engages leg 82 of spring 80 as shown in FIG. 4 when the cover is in the open position for holding the cover in the open position by the effective force provided by the flattened otherwise convexly curved spring 80 exerting a force upwardly against surface 102 which is slightly offset from the axis R of rotation of the cover with respect to the mirror frame for holding the cover in an open position. Cam means includes a second camming surface 104 extending at an angle of approximately 110° from surface 102 and joined thereto by a rounded corner 105 permitting the cover to easily move from the open to the closed position. When the cover is manually rotated to the closed position, surface 104 now engages leg 82 of spring 80 tending to urge the cover toward the closed position by a force now extending on the upper portion of axis R of rotation of the cover. Thus, the spring means 80 and integral socket and cam 90 provided for each of the pivot axles 48 and 49 exert a force which tends to snap open the cover when moved toward the open position and snap and hold closed the cover when moved toward the closed position.

The electrical system for actuating lamps 61 and 63 is best seen with reference to FIGS. 2 and 3. The positive supply conductor 110 extends through a central opening in the hollow pivot rod assembly 14 and 16 and terminates in a connector 112 coupled to a suitable supply conductor from the vehicle's electrical system. Conductor 110 extends into the hollow core 20 of visor 10 and is held to the floor 23 of the visor core by suitable resilient sockets 114. Conductor 110 extends to a first movable contact 120 of the cover actuated switch 125 which comprises a combination of the movable contact 120 and a fixed contact 130. Movable contact 120 as best seen in FIG. 3, is generally U-shaped having one leg 123 including a tab 121 for receiving a snap-on terminal at the end of conductor 110 for coupling conductor 110 to the contact. The center leg 122 of the generally U-shaped contact 120 is held between two fingers 130 and 132 (FIGS. 5 and 6) extending downwardly from the top edge 72 of cover 70 for controlling the movable contact and specifically the rounded contact end 124 thereof in relation to the contact portion 134 of fixed contact 130. Contact 130 is heat staked to the floor 23 of core 20 as seen in FIG. 2 with a conductor 132 extending therefrom to one side of each of a pair of bulb sockets 161 and 163. The remaining common terminal of sockets 161 and 163 are coupled by a conductor 140 to a ground contact 142 which as seen in FIG. 2, is mounted to engage and contact the end of the metallic pivot rod 16 which is coupled to the vehicle ground through the metallic pivot assembly 14. Movable switch contact 120 is held in position against floor 23 of core 20 by a first integrally molded polymeric lug 126 and a second lug 128 at the bend of the U-shaped bendable contact between leg 122 and the left downwardly depending leg 123 as best seen in FIG. 2. Tab 126 extends over the top of the contact 120 to hold it against floor 23 but with sufficient clearance to move freely in a direction toward and way from fixed contact 130.

With cover 70 in an open position as illustrated in FIG. 2, cam member 130 associated with cover 72 as shown in FIG. 5, moves in a clockwise direction as shown in FIG. 5 by arrow A to urge against the upper and outer surface of leg 122 of switch 120 pushing it downwardly toward fixed contact 130 thus making electrical contact as illustrated in FIG. 2. The electrical current supplied by conductor 110 is thereby applied to conductor 132 and to sockets 161 and 163 which are grounded by conductor 140. This illuminates bulbs 61 and 63 fitted within the sockets. As the cover is closed, however, finger 130 disengages contact 122 and finger 132 engages the lower inside surface of contact arm 122 as seen in FIG. 5, as the cover is moved in a now counterclockwise direction opposite arrow A in the figure thereby lifting the contact end 124 away from contact 134 of the fixed contact 130 of switch 125. This then opens the electrical circuit to lamps 61 and 63 thereby extinguishing them. By cradling the movable contact section 122 between two spaced fingers 130 and 132 therefor, the cover 70 provides positive control both for the closing and opening of the electrical switch 125 which assures reliable operation of the switch, the contacts of which are each made from a bendable conductive material such as a brass alloy.

During manufacture, the electrical wiring including contacts 120 and 130 and sockets 161 and 163 with bulbs are inserted onto the receiving receptacles in the integrally formed core floor 23. Next, the cover and mirror package is assembled by first inserting the mirror within aperture 42 and springs 80 within their respective apertures and in alignment over pins 58 an 59 followed by the lenses 51 and 53. The cover 70 is then snap fitted over pivot arms 48 and 49 and moved to a closed position. The package, including frame 40 and cover 70, is then pushed within the recess 22 of the visor with camming fingers 130 and 132 automatically aligned on opposite sides of leg 122 of switch contact 125. The unit is then depressed inwardly into the visor until the locking tabs 47 on the side walls of the downwardly depending flanges snap into correspondingly shaped apertures 25 in the side wall 24 of the recess 22 as seen in FIG. 7, thereby holding the illuminated vanity mirror package in position and completing the assembly.

It will become apparent to those skilled in the art that various modifications to the preferred embodiment of the invention can be made without departing from the spirit or scope thereof as defined by the appended claims.

The embodiments of the invention in which an exclusive property or privilege is claimed are defined as follows:

1. A visor for a vehicle including a visor body having a recess formed in one side for receiving a covered vanity mirror assembly, said covered vanity mirror assembly comprising:

a mirror frame including a mirror receiving central opening and a peripheral flange extending around said opening and extending in a plane generally parallel to the plane of said visor body, said frame including a pair of spaced pivot axles extending adjacent one edge of said flange, said flange including aperture means formed therein adjacent each of said axles;

a wall integrally formed along said one edge of said flange and extending inwardly toward said visor body;

floor means integrally extending from an end of said wall remote from said flange, said floor means extending in spaced generally parallel relationship to said flange; wherein said flange, wall and floor means define a support surface aligned with said axles and spaced therefrom;

a cover including a pair of semicylindrical open socket means on one edge thereof and aligned with said axles to permit said cover to be snap fitted to said axles and pivot between open and closed positions to selectively cover said mirror, at least one of said socket means including a pair of camming surfaces offset from the axis of rotation of said cover; and bias means captively mounted to said support surface of said floor means for engaging said camming surfaces of at least one of said socket means for selectively urging and holding said cover in either an open or closed position.

2. The apparatus as defined in claim 1 wherein said floor means includes means for holding said bias means in position.

3. A visor for a vehicle including a visor body having a recess formed in one side for receiving a covered vanity mirror assembly, said covered vanity mirror assembly comprising:

a mirror frame including a mirror receiving central opening and a peripheral flange extending around said opening and extending in a plane generally parallel to the plane of said visor body, said frame including a pair of spaced pivot axles extending adjacent one edge of said flange, said flange including aperture means formed therein adjacent each of said axles;

a wall integrally formed along said one edge of said flange and extending inwardly toward said visor body;

floor means integrally extending from an end of said wall remote from said flange, said floor means extending in spaced generally parallel relationship to said flange;

a cover including a pair of semicylindrical open socket means on one edge thereof and aligned with said axles to permit said cover to be snap fitted to said axles and pivot between open and closed positions to selectively cover said mirror, at least one of said socket means including a pair of camming surfaces offset from the axis of rotation of said cover; and bias means captively mounted to said floor means for engaging said camming surfaces of at least one of said socket means for selectively urging and holding said cover in either an open or closed position, wherein said floor means includes means for holding said bias means in position; and wherein said bias means is a leaf spring.

4. The apparatus as defined in claim 3 wherein said leaf spring is T-shaped with a central leg coupled to a cross member.

5. The apparatus as defined in claim 4 wherein said central leg includes an aperture near an end remote from said cross member and wherein said holding means comprises a projection extending into said aperture.

6. The apparatus as defined in claim 5 wherein each of said socket means includes camming surfaces and said bias means comprises a pair of T-shaped leaf springs for engaging said camming surfaces of said socket means.

7. The apparatus as defined in claim 6 wherein said floor means includes segments spaced on opposite sides of said wall and said wall includes access openings through which said central legs of said T-shaped springs extend.

8. A covered illuminated vanity mirror visor comprising:

a visor body including a recess for receiving a covered illuminated vanity mirror assembly;

an illuminated vanity mirror assembly mounted within said recess of said visor body and including means for supporting a mirror and a cover for said mirror, said cover movable between a position covering said mirror and exposing said mirror for use, said cover including a pair of spaced fingers extending therefrom and movable with the movement of said cover; and illumination means including lamp means and switch means for selectively coupling said lamp means to a supply of electrical power, wherein said switch means includes a movable element extending between said fingers of said cover to be alternately pushed in opposite directions to open and close said switch means when said cover is closed and opened respectively.

9. The apparatus as defined in claim 8 wherein said switch means is mounted within said visor body and said vanity mirror assembly includes a mirror frame having aperture means through which said fingers extend to engage said switch means.

10. The apparatus as defined in claim 9 wherein said movable element of said switch means comprises a switch arm made of a bendable material.

11. The apparatus as defined in claim 10 wherein said illumination means comprises lamp means on opposite sides of said mirror.

12. A visor for a vehicle including a visor body having a recess formed in one side for receiving a covered vanity mirror assembly, said covered vanity mirror assembly comprising:

a mirror frame including a mirror receiving central opening and a peripheral flange extending around said opening and extending in a plane generally parallel to the plane of said visor body, said frame including a pair of spaced pivot axles extending adjacent one edge of said flange, said flange including aperture means formed therein adjacent each of said axles;

a wall integrally formed along said one edge of said flange and extending inwardly toward said visor body;

floor means integrally extending from an end of said wall remote from said flange, said floor means extending in spaced generally parallel relationship to said flange;

a cover including a pair of semicylindrical open socket means on one edge thereof and aligned with said axles to permit said cover to be snap fitted to said axles and pivot between open and closed positions to selectively cover said mirror, at least one of said socket means including a pair of camming surfaces offset from the axis of rotation of said cover;

bias means captively mounted to said floor means for engaging said camming surfaces of at least one of said socket means for selectively urging and holding said cover in either an open or closed position; and illumination means for said mirror, said illumination means including lamp means and switch means for selectively coupling said lamp means to a supply of electrical power, wherein said switch means comprises a movable element and wherein said cover includes a pair of spaced fingers extending on opposite sides of said movable element to alternately push said movable element in opposite directions in response to movement of said cover for closing said switch when said cover is open and for opening said switch when said cover is in a closed position.

13. The apparatus as defined in claim 12 wherein said visor body includes a body wall extending orthogonally to the plane of said visor body and said mirror frame includes a second wall which extends adjacent and in parallel relationship to said body wall, said body wall including a notch and said second wall including a tab aligned with said notch and extending therein for locking said mirror frame to said visor body.

14. The apparatus as defined in claim 13 wherein said floor means includes means for holding said bias means in position.

15. The apparatus as defined in claim 14 wherein said bias means is a leaf spring.

16. The apparatus as defined in claim 15 wherein said leaf spring is T-shaped with a central leg coupled to a cross member.

17. The apparatus as defined in claim 16 wherein said central leg includes an aperture near an end remote from said cross member and wherein said holding means comprises a projection extending into said aperture.

18. A covered vanity mirror assembly for attachment to a visor, said covered vanity mirror assembly comprising:

a mirror frame including a mirror receiving central opening and a peripheral flange extending around said opening, said frame including pair of spaced pivot axles extending adjacent one edge of said flange, said flange including aperture means formed therein adjacent each of said axles;

a wall integrally formed along said one edge of said flange and extending orhtogonally therefrom;

floor means integrally extending from an end of said wall remote from said flange, said floor means extending in spaced generally parallel relationship to said flange; wherein said flange, wall and floor means define a support surface aligned with said axles and spaced therefrom;

a cover including a pair of semicylindrical open socket means on one edge thereof and aligned with said axles to permit said cover to be snap fitted to said axles and pivot between open and closed positions to selectively cover said mirror, at least one of said socket means including a pair of camming surfaces offset from the axis of rotation of said cover; and bias means captively mounted to said support surface of said floor means for engaging said camming surfaces of at least one of said socket means for selectively urging and holding said cover in either an open or closed position.

19. The apparatus as defined in claim 18 and further including means for attaching said assembly to a visor.

* * * * *